United States Patent
Nam et al.

(10) Patent No.: US 8,576,361 B2
(45) Date of Patent: Nov. 5, 2013

(54) TRANSREFLECTIVE LIQUID CRYSTAL DISPLAY DEVICE AND FABRICATING METHOD THEREOF HAVING UNEVEN PATTERNS CONSISTING OF ORGANIC MATERIAL IN THE REFLECTIVE PORTION

(75) Inventors: Mi-Sook Nam, Kyonggi-do (KR); Dong-Guk Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/603,990

(22) Filed: Jun. 26, 2003

(65) Prior Publication Data
US 2004/0125289 A1    Jul. 1, 2004

(30) Foreign Application Priority Data
Dec. 31, 2002    (KR) .................. 10-2002-0088387

(51) Int. Cl.
*G02F 1/1335*    (2006.01)
(52) U.S. Cl.
USPC ............................................. 349/114
(58) Field of Classification Search
USPC ...................................... 349/113, 114
See application file for complete search history.

(56) References Cited

U.S. PATENT DOCUMENTS

| | | | | |
|---|---|---|---|---|
| 5,408,345 | A * | 4/1995 | Mitsui et al. ................. | 349/42 |
| 5,500,700 | A | 3/1996 | Massarsky et al. | |
| 6,195,140 | B1 * | 2/2001 | Kubo et al. ................... | 349/44 |
| 6,281,952 | B1 * | 8/2001 | Okamoto et al. ............. | 349/12 |
| 6,341,002 | B1 | 1/2002 | Shimizu et al. | |
| 6,396,470 | B1 * | 5/2002 | Zhang et al. ................. | 345/87 |
| 6,697,138 | B2 * | 2/2004 | Ha et al. ...................... | 349/114 |
| 6,750,932 | B2 * | 6/2004 | Kim ............................. | 349/114 |
| 6,765,637 | B2 * | 7/2004 | Takenaka ..................... | 349/113 |
| 6,809,785 | B2 * | 10/2004 | Fujino ......................... | 349/114 |
| 6,839,107 | B2 * | 1/2005 | Kobashi ....................... | 349/113 |
| 6,850,298 | B2 * | 2/2005 | Fujimori et al. ............. | 349/114 |
| 6,927,820 | B2 * | 8/2005 | Jang et al. .................... | 349/114 |
| 7,023,508 | B2 * | 4/2006 | You .............................. | 349/113 |
| 7,123,325 | B2 * | 10/2006 | Maeda et al. ................ | 349/113 |
| 2001/0019373 | A1 * | 9/2001 | Kobayashi et al. ........... | 349/39 |
| 2002/0140887 | A1 * | 10/2002 | Maeda et al. ................ | 349/113 |
| 2002/0159016 | A1 * | 10/2002 | Nishida et al. .............. | 349/141 |
| 2002/0171792 | A1 * | 11/2002 | Kubota et al. ............... | 349/114 |
| 2003/0030768 | A1 * | 2/2003 | Sakamoto et al. ........... | 349/113 |
| 2003/0053012 | A1 * | 3/2003 | Ikeno et al. .................. | 349/106 |
| 2003/0058389 | A1 * | 3/2003 | Ha et al. ...................... | 349/113 |
| 2003/0071944 | A1 * | 4/2003 | Baek ............................ | 349/113 |
| 2003/0081159 | A1 * | 5/2003 | Ha et al. ...................... | 349/113 |

FOREIGN PATENT DOCUMENTS

JP    2000-187220    4/2000

* cited by examiner

*Primary Examiner* — Edward Glick
*Assistant Examiner* — Dennis Y Kim
(74) *Attorney, Agent, or Firm* — Morgan, Lewis & Bockius LLP

(57) ABSTRACT

A transflective liquid crystal display device and a fabricating method thereof are disclosed in the present invention. The transflective liquid crystal display device includes a substrate having a reflective portion and a transmissive portion, a gate line on the substrate, a data line crossing the gate line and defining a pixel region, a thin film transistor connected to the gate line and the data line, a first organic material layer in the pixel region, the first organic material layer having a plurality of uneven patterns at the reflective portion, a second organic material layer on the first organic material layer, the second organic material layer having an open portion at the transmissive portion, and a reflective layer on the second organic material layer having a transmissive hole at the open portion.

18 Claims, 11 Drawing Sheets

TRANSREFLECTIVE LIQUID CRYSTAL DISPLAY DEVICE AND FABRICATING METHOD THEREOF HAVING UNEVEN PATTERNS CONSISTING OF ORGANIC MATERIAL IN THE REFLECTIVE PORTION

This application claims the benefit of the Korean Application No. P2002-088387 filed on Dec. 31, 2002, which is hereby incorporated by reference.

BACKGROUND OF THE INVENTION

1. Field of the Invention

The present invention relates to a liquid crystal display device, and more particularly, to a transflective liquid crystal display device and a fabricating method thereof. Although the present invention is suitable for a wide scope of applications, it is particularly suitable for simplifying a fabrication process and improving a production yield.

2. Discussion of the Related Art

Generally, transflective liquid crystal display (LCD) devices function as both transmissive and reflective LCD devices. Since the transflective LCD devices can use both a backlight and the exterior natural or artificial light, the transflective LCD devices are not restricted from the circumstances, and a power consumption of the transflective LCD devices can be reduced.

FIG. 1 is a schematic perspective view of a transflective liquid crystal display device according to the related art.

In FIG. 1, a transflective liquid crystal display (LCD) device 29 includes first and second substrates 30 and 15 facing into and spaced apart from each other, and a liquid crystal layer 23 interposed therebetween. A switching element "T" and array lines 34 and 46 are on the inner surface of the first substrate 30. A pixel electrode including a reflective electrode 52 and a transparent electrode 64 is formed in a pixel region "P" of the first substrate 30. The reflective electrode 52 has a transmissive hole "A". The pixel electrode except for the transmissive hole "A" functions as a reflective portion "C". A black matrix 19 and a sub-color filter 17 are formed on the inner surface of the second substrate 15. A common electrode 13 is formed on the black matrix 19 and the sub-color filter 17.

FIG. 2 is a schematic cross-sectional view of the transflective liquid crystal display device according to the related art.

In FIG. 2, a transflective liquid crystal display (LCD) device 29 includes first and second substrates 30 and 15, a liquid crystal layer 23 interposed therebetween, and a backlight unit 41 under the first substrate 30. A pixel electrode including a transparent electrode 64 and a reflective electrode 52 are formed on the inner surface of the first substrate 30. The reflective electrode 52 has a transmissive hole "A". Even though the reflective electrode 52 is formed over the transparent electrode 64 in FIG. 2, the reflective electrode can be formed under the transparent electrode. A common electrode 13 is formed on the inner surface of the second substrate 15.

In a reflective mode, the transflective LCD device 29 uses the exterior natural or artificial light. An incident light "J" passing through the second substrate 15 is reflected at the reflective electrode 52 and then passes through the liquid crystal layer 23 aligned by an electric field between the reflective electrode 52 and the common electrode 13. Images are displayed by modulating an intensity of the incident light "J" and the reflected light according to the alignment of the liquid crystal layer 23.

In a transmissive mode, light "F" from the backlight unit 41 under the first substrate 30 is used. The light "F" emitted from the backlight unit 41 enters the liquid crystal layer 23 through the transparent electrode 64. The liquid crystal layer 23 is aligned by an electric field between the transparent electrode 64 and the common electrode 13, and images are displayed through the transmissive hole "A" by modulating an intensity of the light "F" from the backlight unit 41 according to the alignment of the liquid crystal layer 23.

FIG. 3 is a schematic plane view showing an array substrate for the transflective liquid crystal display device according to the related art.

In FIG. 3, a thin film transistor (TFT) "T", which is a switching element, is disposed on a substrate 30 in a matrix. The substrate 30 is referred to as an array substrate. A gate line 34 and a data line 46 crossing each other are connected to the TFT "T". A pixel region "P" is defined at each intersection of the gate line 34 and the data line 46. A reflective layer 52 having a transmissive hole "A" is formed in the pixel region "P". A storage capacitor "S" is formed at a portion of the gate line 34 and electrically connected to a transparent pixel electrode 64 in parallel. A gate pad 36 and a data pad 48 are formed at the ends of the gate line 34 and the data line 46, respectively. Signals are applied to the gate pad 36 and the data pad 48 from an external circuit (not shown). The TFT "T" includes a gate electrode 32, an active layer 40 over the gate electrode 32, and source and drain electrodes 42 and 44.

FIGS. 4A to 4D are schematic cross-sectional views showing the fabricating method of the array substrate for the transflective liquid crystal display device according to the related art. FIGS. 4A to 4D are taken along line IV-IV of FIG. 3.

In FIG. 4A, after depositing a conductive metal layer on a substrate 30, a gate electrode 32, a gate line 34 (shown in FIG. 3), and a gate pad 36 at one end of the gate line 34 (shown in FIG. 3) are formed through the first mask process. A first insulating layer 38 is formed on the gate electrode 32, the gate line 34 (shown in FIG. 3), and the gate pad 36. A semiconductor layer 40 including an active layer 40a of amorphous silicon and an ohmic contact layer 40b of impurity-doped amorphous silicon is formed on the first insulating layer 38 over the gate electrode 32 through the second mask process. The semiconductor layer 40 has an island shape.

In FIG. 4B, after depositing a conductive metal layer on the ohmic contact layer 40b, source and drain electrodes 42 and 44, a data line 46, and a data pad 48 are formed through the third mask process. The source electrode 42 is connected to the data line 46, and the data pad 48 is formed at one end of the data line 46. A capacitor electrode 50 (shown in FIG. 3) of an island shape is formed on the gate line 34 (shown in FIG. 3). The capacitor electrode 50 (shown in FIG. 3) may not be formed on the gate line 34. A second insulating layer 48 is formed on the source and drain electrodes 42 and 44. After depositing a metallic material layer having high reflectance such as aluminum (Al) on the second insulating layer 50, a reflective layer 52 having a transmissive hole "A" in the pixel region "P" is formed through the fourth mask process.

In FIG. 4C, after a third insulating layer 54 is formed on the reflective layer 52, a drain contact hole 56 exposing the drain electrode 44, an open portion 58 corresponding to the transmissive hole "A", a gate pad contact hole 60 exposing the gate pad 36, and a data pad contact hole 62 exposing the data pad 48 are formed through the fifth mask process.

In FIG. 4D, after depositing a transparent conductive material on the third insulating layer 54, a pixel electrode 64, a gate pad terminal 66, and a data pad terminal 68 are formed through the sixth mask process. The pixel electrode 64 is connected to the drain electrode 44 and formed in the pixel region "P". The gate pad terminal 66 and the data pad terminal 68 are connected to the gate pad 36 and the data pad 48, respectively.

FIG. 5 is a schematic cross-sectional view of the transflective liquid crystal display device including the array substrate of FIG. 4D according to the related art.

In FIG. 5, the transflective liquid crystal display device includes a transmissive portion "t" and a reflective portion "r". To improve the light efficiency of the transmissive portion "t" and the reflective portion "r", a first cell gap "$d_1$" of the transmissive portion "t" is formed to be double of a second cell gap "$d_2$" of the reflective portion "r". The first and second cell gaps having different values in the transmissive portion and the reflective portion are referred to as a dual cell gap. Two methods to form the dual cell gap are suggested. The first method for the dual cell gap is to form a step in the first substrate, and the second method is to form a step in the second substrate. Recently, methods to form steps in the first and second substrates are mainly used for the dual cell gap.

In FIG. 5, even though the first cell gap "$d_1$" of the transmissive portion "t" is formed to be double of the second cell gap "$d_2$" of the reflective portion "r", reflection efficiency is poor because a reflective layer 52 is a mirror type. When the reflective layer 52 is an uneven surface type instead of a mirror type, the reflection efficiency of the reflective portion "r" is improved due to scattering phenomenon at the reflective layer 52. Accordingly, it is necessary to form a dual cell gap for improving the light efficiency of reflective and transmissive portions and an uneven surface for improving the reflection efficiency of a reflective electrode at the same time in an LCD device.

SUMMARY OF THE INVENTION

Accordingly, the present invention is directed to a transflective liquid crystal display device and a fabricating method thereof that substantially obviates one or more of problems due to limitations and disadvantages of the related art.

Another object of the present invention is to provide a transflective liquid crystal display device having a dual cell gap and an uneven surface of a reflective electrode by using a photosensitive organic material layer and a fabricating method thereof.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a transflective liquid crystal display device includes a substrate having a reflective portion and a transmissive portion, a gate line on the substrate, a data line crossing the gate line and defining a pixel region, a thin film transistor connected to the gate line and the data line, a first organic material layer in the pixel region, the first organic material layer having a plurality of uneven patterns at the reflective portion, a second organic material layer on the first organic material layer, the second organic material layer having an open portion at the transmissive portion, and a reflective layer on the second organic material layer having a transmissive hole at the open portion.

In another aspect of the present invention, a transflective liquid crystal display device includes first and second substrates facing into and spaced apart from each other, the first and second substrates having a reflective portion and a transmissive portion, a gate line on an inner surface of the first substrate, a data line crossing the gate line and defining a pixel region, a thin film transistor connected to the gate line and the data line, a first organic material layer in the pixel region, the first organic material layer having a plurality of uneven patterns at the reflective portion, a second organic material layer on the first organic material layer, the second organic material layer having an open portion at the transmissive portion, a reflective layer on the second organic material layer having a transmissive hole corresponding to the open portion, a pixel electrode on the reflective layer, a common electrode on an inner surface of the second substrate, and a liquid crystal layer between the pixel electrode and the common electrode, wherein the pixel electrode and the common electrode are separated by a first cell gap, and a second cell gap in the reflective portion, and the first cell gap is twice greater than the second cell gap in the transmissive portion.

In another aspect of the present invention, a method of fabricating a transflective liquid crystal display device includes forming a gate line on a substrate having a reflective portion and a transmissive portion, forming a data line crossing the gate line and defining a pixel region, forming a thin film transistor connected to the gate line and the data line, forming a first photosensitive organic material layer on the substrate, forming a first organic material layer having a plurality of uneven patterns at the reflective portion by performing an exposure and development process on the first photosensitive organic material layer, forming a second photosensitive organic material layer on the substrate including the first organic material layer, forming a second organic material layer having an open portion corresponding to the transmissive portion by performing an exposure and development process on the second photosensitive organic material layer, and forming a reflective layer on the second photosensitive organic material layer having a transmissive hole corresponding to the open portion.

In a further aspect of the present invention, a method of fabricating a transflective liquid crystal display device includes forming a gate line on a first substrate having a reflective portion and a transmissive portion, forming a data line crossing the gate line and defining a pixel region, forming a thin film transistor connected to the gate line and the data line, forming a first photosensitive organic material layer on the first substrate, forming a first organic material layer having a plurality of uneven patterns at the reflective portion by performing an exposure and development process on the first photosensitive organic material layer, forming a second photosensitive organic material layer on the first substrate having the first organic material layer, forming a second organic material layer having an open portion corresponding to the transmissive portion by performing an exposure and development process on the second photosensitive organic material layer, forming a reflective layer on the second organic material layer having a transmissive hole corresponding to the open portion, forming a pixel electrode on the reflective layer, forming a common electrode on a second substrate, attaching the first and second substrates to each other, and forming a liquid crystal layer between the pixel electrode and the common electrode, wherein the pixel electrode and the common electrode are separated by a first cell gap in the transmissive portion and a second cell gap in the reflective portion, and the first cell gap is twice greater than the second cell gap.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
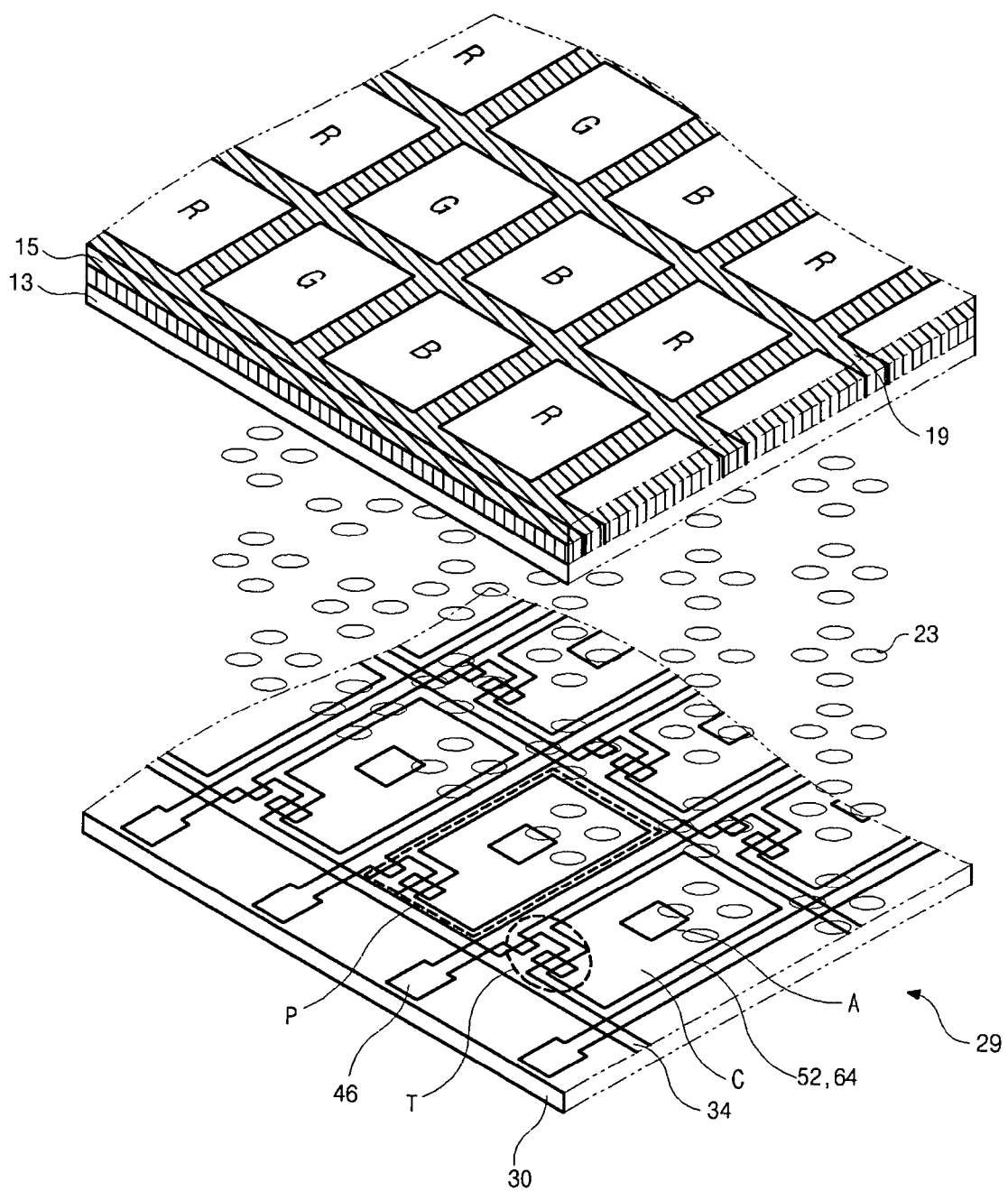
FIG. 1 is a schematic perspective view of a transflective liquid crystal display device according to the related art.
Figure 2:
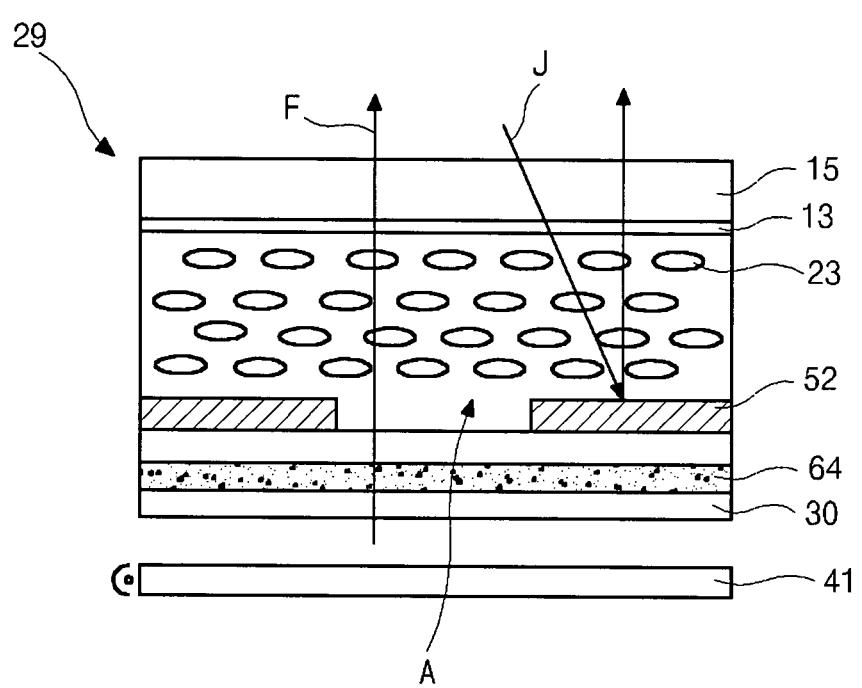
FIG. 2 is a schematic cross-sectional view of the transflective liquid crystal display device according to the related art.
Figure 3:
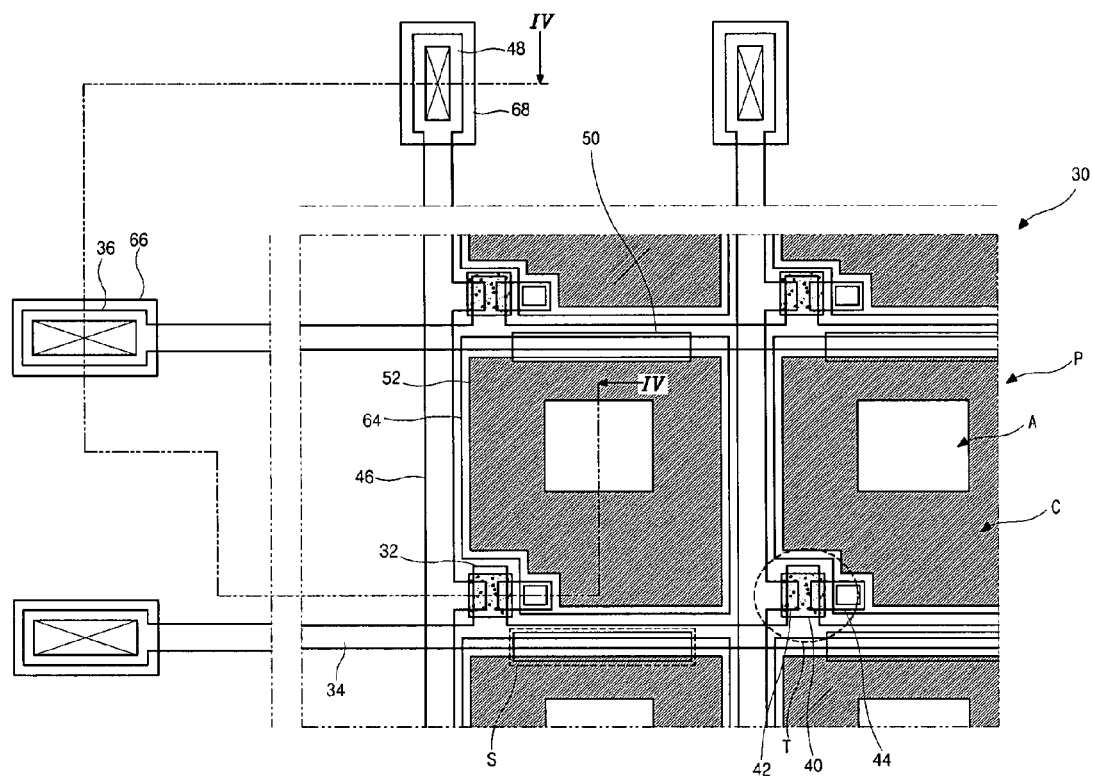
FIG. 3 is a schematic plane view showing an array substrate for the transflective liquid crystal display device according to the related art.
Figure 4A:
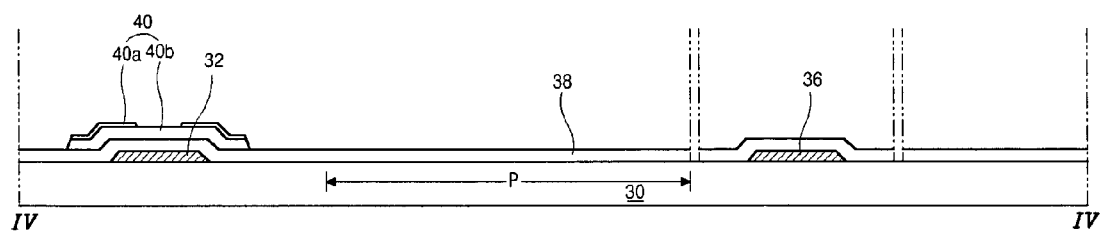
FIGS. 4A to 4D are schematic cross-sectional views showing the fabricating method of the array substrate for the transflective liquid crystal display device according to the related art.
Figure 4B:
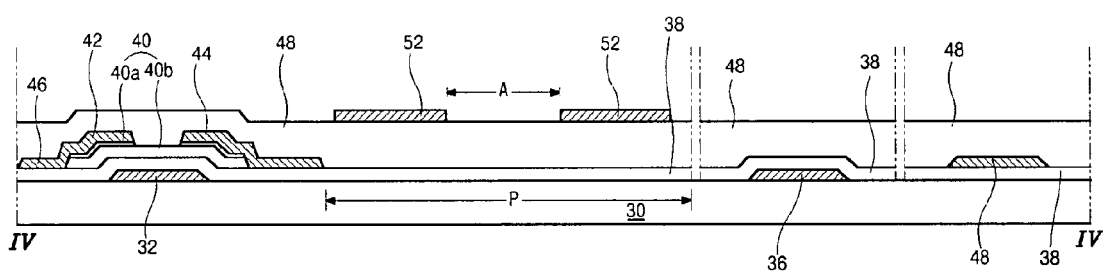
Figure 4C:
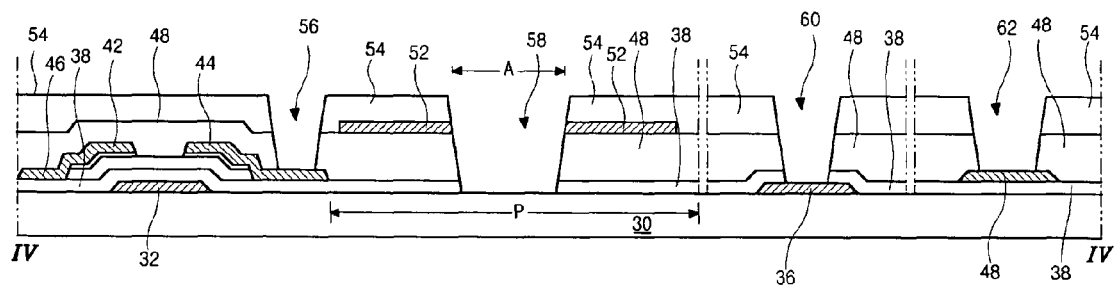
Figure 4D:
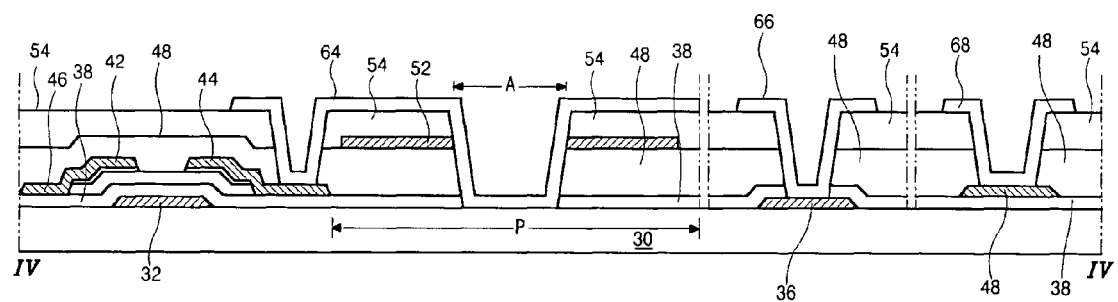
Figure 5:
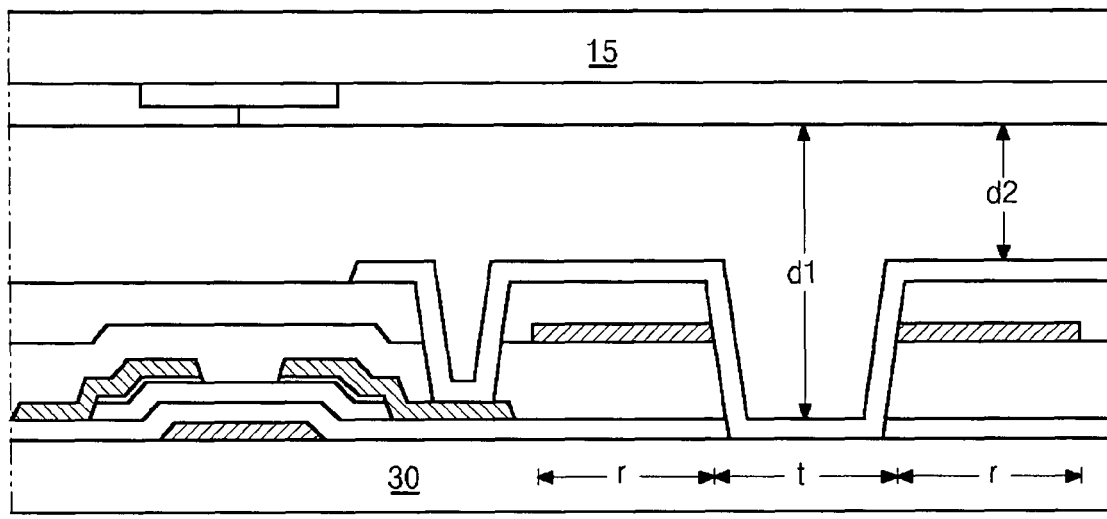
FIG. 5 is a schematic cross-sectional view of the transflective liquid crystal display device including the array substrate of FIG. 4D according to the related art.
Figure 6:
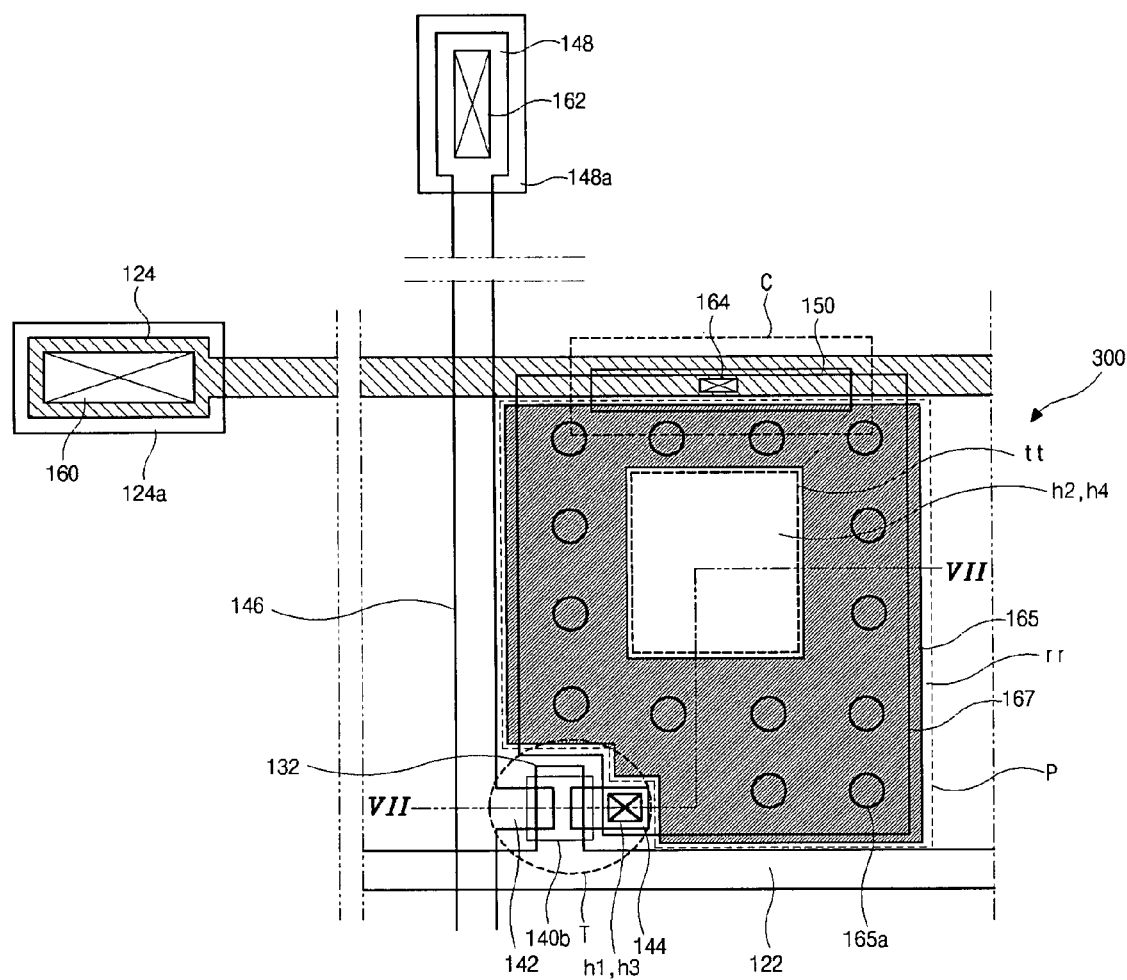
FIG. 6 is a schematic plane view of the array substrate for the transflective liquid crystal display device according to the present invention.

FIG. 6 is a schematic plane view of the array substrate for the transflective liquid crystal display device according to the present invention.

As shown in FIG. 6, a gate line 122 and a data line 146 are formed on a substrate 300. The gate line 122 and the data line 146 cross each other and define a pixel region "P" including a transmissive portion "tt" and a reflective portion "rr". A thin film transistor (TFT) "T" including a gate electrode 132, an active layer 130b, and source and drain electrodes 142 and 144, is connected to the gate line 122 and the data line 146. The gate electrode 132 is connected to the gate line 122, and the source electrode 142 is connected to the data line 146. A gate pad 124 is formed at one end of the gate line 122, and a data pad 148 is formed at one end of the data line 146. Signals are applied to the gate pad 124 and the data pad 148 from an external circuit (not shown). A gate pad terminal 124a may be connected to the gate pad 124 through a gate pad contact hole 160, and a data pad terminal 148a may be connected to the data pad 148 through a data pad contact hole 162. A capacitor electrode 150 overlaps a portion of the gate line 122 and forms a storage capacitor "$C_{ST}$".

A reflective layer 165 and a pixel electrode 167 are formed in the pixel region "P". The reflective layer 165 has a transmissive hole "h4" corresponding to the transmissive portion "tt" and an uneven surface 165a corresponding to the reflective portion "rr". The pixel electrode 167 is connected to the drain electrode 144 through a drain contact hole "h3".

FIGS. 7A to 7H are schematic cross-sectional views showing the fabricating process of the array substrate for the transflective liquid crystal display device according to the present invention. FIGS. 7A to 7H are taken along line VII-VII of FIG. 6.

Figure 7A:
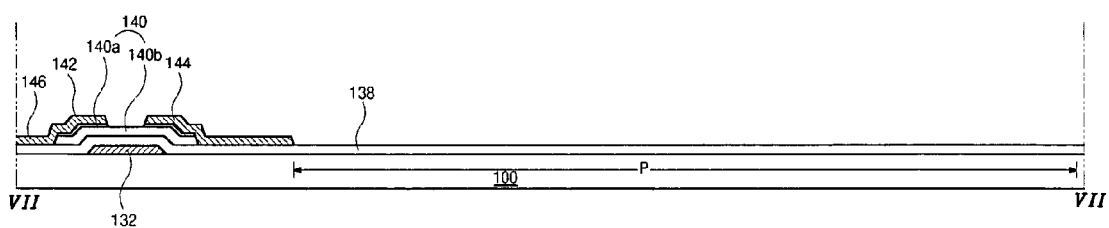
FIGS. 7A to 7H are schematic cross-sectional views showing the fabricating process of the array substrate for the transflective liquid crystal display device according to the present invention.

In FIG. 7A, a gate electrode 132 is formed on a substrate 100 having a pixel region "P" by depositing and patterning a conductive metallic material layer, formed of one of aluminum (Al), chromium (Cr), and molybdenum (Mo). A gate line 122 (shown in FIG. 6) connected to the gate electrode 132 is formed at the same time. A first inorganic material layer 138 is formed on the gate electrode 132 by depositing one of an inorganic insulating material layer formed of one of silicon nitride ($SiN_x$) and silicon oxide ($SiO_2$). A semiconductor layer 140 including an active layer 140b of intrinsic amorphous silicon and an ohmic contact layer 140a of impurity-doped amorphous silicon is formed on the first inorganic material layer 138 over the gate electrode 132. Source and drain electrodes 142 and 144 facing into each other is formed on the semiconductor layer 140 by depositing and patterning a conductive metallic layer formed of one of aluminum (Al), chromium (Cr), and molybdenum (Mo). The source electrode 142 is connected to the data line 146.

Figure 7B:
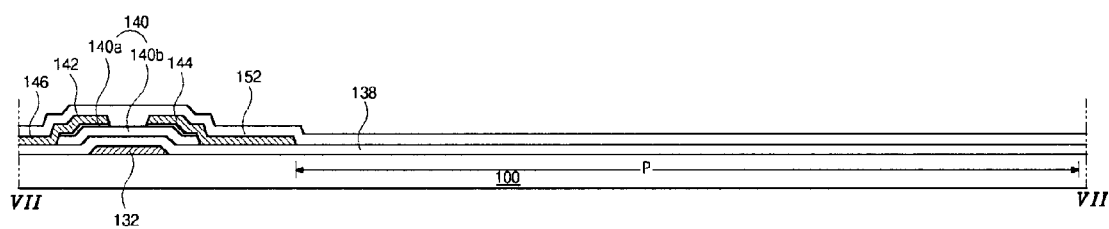

In FIG. 7B, a second inorganic material layer 152 is formed on the entire surface of the substrate 100 having the source and drain electrodes 142 and 144 by depositing one of an inorganic insulating material layer formed of one of silicon nitride ($SiN_x$) and silicon oxide ($SiO_2$).

Figure 7C:
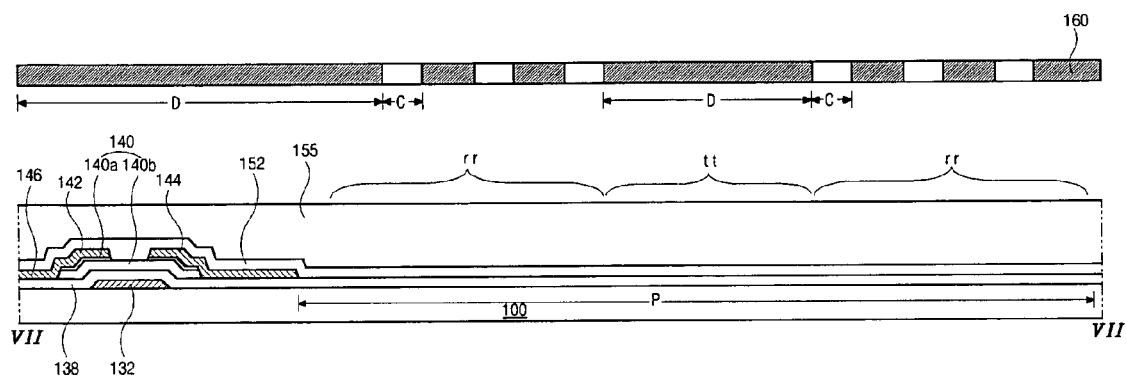

In FIG. 7C, a first organic material layer 155 is formed on the second inorganic material layer 152 by depositing a first photosensitive organic insulating material. A mask 160 having a transmissive region "C" and a shielding region "D" is disposed over the first organic material layer 155. The first photosensitive organic insulating material may be a photoacrylic resin. The first photosensitive organic insulating material may be a positive type for an irradiated portion through development and a negative type for an irradiated portion through development. For example, the first photosensitive organic insulating material of a negative type will be illustrated. For the negative type, the transmissive region "C" of the mask 160 corresponds to a reflective portion "rr" of the substrate 100, and the shielding region "D" of the mask 160 corresponds to a transmissive portion "tt" and a peripheral portion of the pixel region "P". The second inorganic material layer 152 may be omitted in the present invention. After aligning the mask 160, the light is irradiated onto the first organic material layer 155 through the mask 160.

Figure 7D:
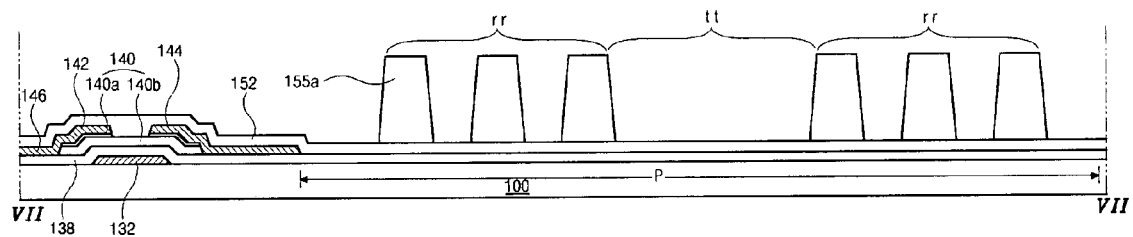

In FIG. 7D, a plurality of uneven patterns 155a in the reflective portion "rr" are obtained through an exposure and development process of the first organic material layer 155. The first organic material layer 155 corresponding to the transmissive portion "tt" and the peripheral portion of the pixel region "P" is eliminated.

Figure 7E:
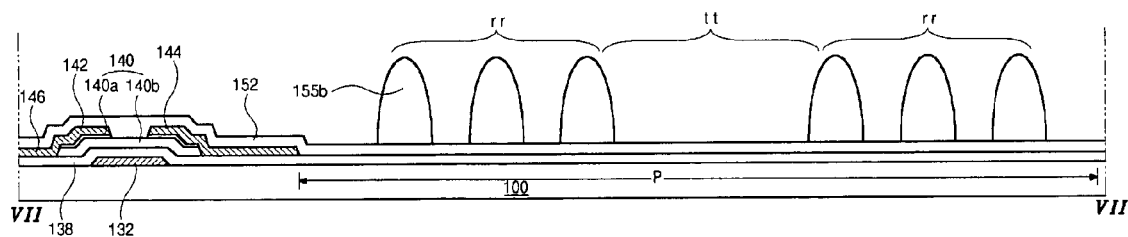

In FIG. 7E, the plurality of uneven patterns 155a (shown in FIG. 7D) having a rectangular top surface are melted and hardened, so that a plurality of embossing patterns 155b having a round top surface are formed. The plurality of embossing patterns 155b having a round top surface can be obtained through an exposure and development process of the first organic material layer 155 by using a mask having slits.

Figure 7F:
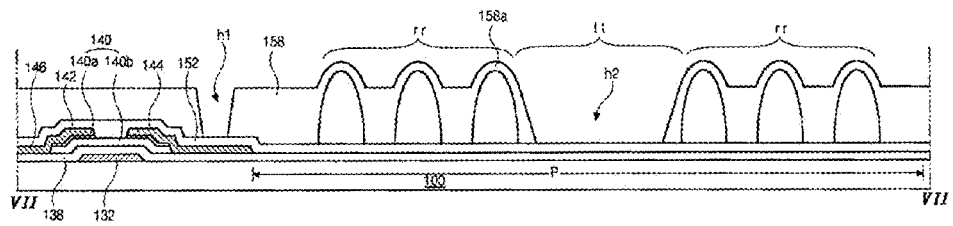

In FIG. 7F, a second organic material layer 158 is formed on the plurality of embossing patterns 155b by depositing a second photosensitive organic insulating layer. The second photosensitive organic insulating material may be formed of a photo-acrylic resin. The second organic material layer 158 has a first uneven surface 158a corresponding to the plurality of embossing patterns 155b, which are not planarized. The second organic material layer 158 has a drain hole "h1" exposing a portion of the second inorganic material layer 152 and an open portion "h2" at the transmissive portion "tt". Accordingly, the second organic material layer 158 of the reflective portion "rr" has the first uneven surface 158a, and the second organic material layer 158 of the transmissive portion "tt" and a portion of the drain electrode 144 is eliminated. As shown in FIG. 6, the second organic material layer 158 has a capacitor contact hole 164, a gate pad contact hole 160, and a data pad contact hole 162. The capacitor contact hole 164 exposes a capacitor electrode 150 overlapping the gate line 122. The gate pad contact hole 160 and the data pad contact hole 162 expose a gate pad 124 (shown in FIG. 6) and a data pad 148 (shown in FIG. 6), respectively.

Figure 7G:
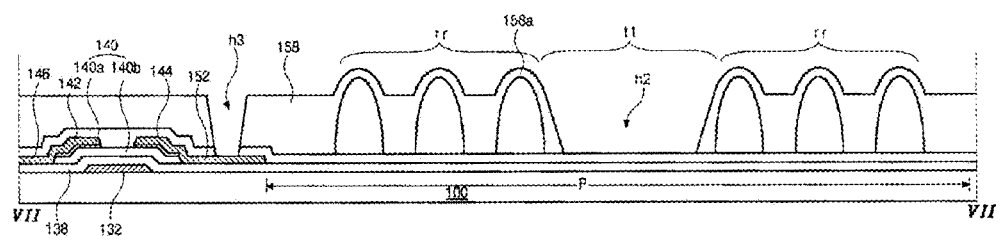

In FIG. 7G, a drain contact hole "h3" is completed by etching the second inorganic material layer 152 through the drain hole "h1".

Figure 7H:
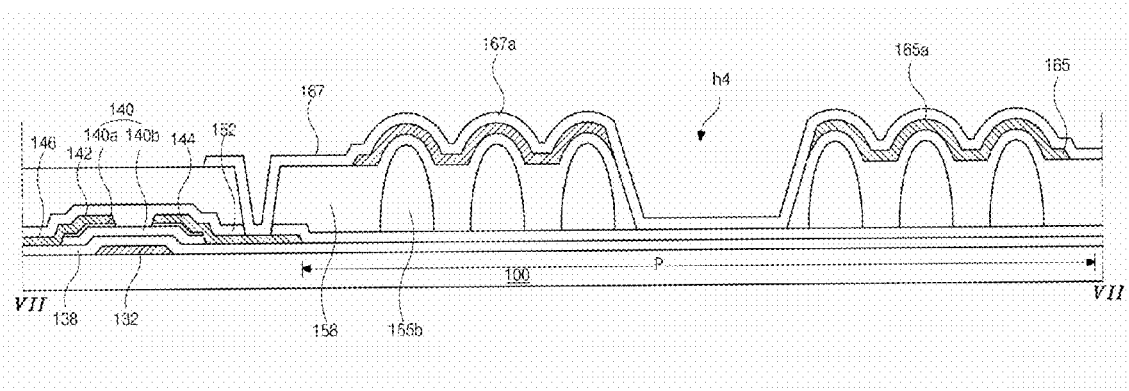

In FIG. 7H, a reflective layer 165 is formed on the second organic material layer 158 by depositing and patterning a metallic material having a high reflectance. For example, aluminum (Al) may be used for the reflective layer 165. The reflective layer 165 has a second uneven surface 165a in the reflective portion "rr" and a transmissive hole "h4" in the transmissive portion "tt". The second uneven surface 165a corresponds to the first uneven surface 158a. A pixel electrode 167 is formed on the reflective layer 165 by depositing and patterning a transparent conductive material such as indium-tin-oxide (ITO) and indium-zinc-oxide (IZO).

Figure 8:
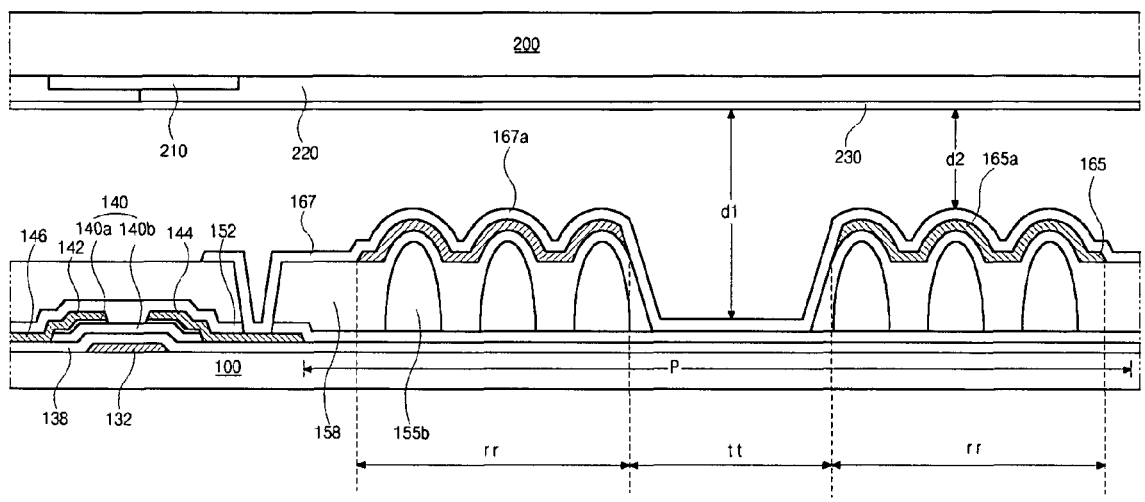
FIG. 8 is a schematic cross-sectional view of the transflective liquid crystal display device according to the present invention.

FIG. 8 is a schematic cross-sectional view of the transflective liquid crystal display device according to the present invention. The transflective LCD device of FIG. 8 includes the array substrate of FIG. 7H.

In FIG. 8, first and second substrates 100 and 200 face into and are spaced apart from each other. Detailed descriptions for the first substrate 100 will be omitted. A black matrix 210 and a color filter layer 220 are formed on the inner surface of the second substrate 200. A common electrode 230 is formed on the black matrix 210 and the color filter layer 220.

The first and second substrates 100 and 200 have a pixel region "P" having a transmissive portion "tt" and a reflective portion "rr". The transflective LCD device has first and second cell gaps "$d_1$" and "$d_2$". The first cell gap "$d_1$" between the pixel electrode 167 of the transmissive portion "tt" and the common electrode 230 is twice greater than the second cell gap "$d_2$" between the pixel electrode 167 of the reflective portion "rr". To obtain such a relation between the first and second cell gaps "$d_1$" and "$d_2$", a plurality of embossing patterns 155b may be formed to have a height equal to or less than the second cell gap "$d_2$". Moreover, the reflective layer 165 has an uneven surface 165a in the reflective portion "rr". Therefore, a high light efficiency between the reflective and transmissive portions "rr" and "tt" due to the dual cell gap and a high reflection efficiency of the reflective layer 165 due to the uneven surface 165a can be obtained at the same time.

Contrary to the transflective LCD device according to the related art where a dual cell gap is obtained by etching an organic insulating layer of the transmissive portion, the transflective LCD device according to the present invention obtains a dual cell gap and an uneven surface of a reflective layer at the same time by using a photosensitive organic insulating material such as a photo-acrylic resin. Since the dual cell gap and the uneven surface of the reflective layer is obtained through a single process, the fabricating process of a transflective LCD device is simplified and the production yield is improved.

It will be apparent to those skilled in the art that various modifications and variations can be made in the transflective liquid crystal display device and the fabricating method thereof of the present invention without departing from the spirit or scope of the inventions. Thus, it is intended that the present invention covers the modifications and variations of this invention provided they come within the scope of the appended claims and their equivalents.

What is claimed is:

1. A transflective liquid crystal display device, comprising:
   a substrate having a switching portion, a reflective portion and a transmissive portion, a pixel region being defined to include the reflective and transmissive portions;
   a gate line on the substrate;
   a data line crossing the gate line;
   a thin film transistor connected to the gate line and the data line and including a gate electrode, an active layer, and source and drain electrodes, the thin film transistor and the drain electrode on the switching portion, and the drain electrode being an electrode directly connected to a drain region of the thin film transistor and not overlapping the pixel region, wherein the thin film transistor is disposed within the switching portion;
   a plurality of uneven patterns consisting of a first organic material layer within the reflective portion, the uneven patterns partially covering the substrate, wherein the plurality of uneven patterns are disposed within the reflective portion but are not formed over the switching portion, and the reflective portion and the transmissive portion do not overlap each other;
   a second organic material layer on the first organic material layer, the second organic material layer having an open portion at the transmissive portion;
   a reflective layer on the second organic material layer having a transmissive hole at the open portion, the reflective layer disposed on the pixel region and not overlapping the drain electrode;
   a pixel electrode on the reflective layer, wherein the pixel electrode is in direct contact with the drain electrode;
   an opposing substrate facing the substrate; and
   a common electrode on an inner surface of the opposing substrate, the common electrode being substantially flat.

2. The device according to claim 1, wherein the first and second organic material layers are formed from a photosensitive material.

3. The device according to claim 2, wherein the photosensitive material comprises a photo-acrylic resin.

4. The device according to claim 1, further comprising an inorganic material layer covering the gate line, the data line, and the thin film transistor.

5. The device according to claim 4, wherein the inorganic material layer is formed of one of silicon nitride and silicon oxide.

6. The device according to claim 1, further comprising a gate pad connected to the gate line, a data pad connected to the data line, and a capacitor electrode overlapping the gate line.

7. The device according to claim 6, wherein the second organic material layer has a drain contact hole exposing the drain electrode, a capacitor contact hole exposing the capacitor electrode, a gate pad contact hole exposing the gate pad, and a data pad contact hole exposing the data pad.

8. A transflective liquid crystal display device, comprising:
   first and second substrates facing into and spaced apart from each other, the first and second substrates having a switching portion, a reflective portion and a transmissive portion, a pixel region being defined to include the reflective and transmissive portions;

a gate line on an inner surface of the first substrate;

a data line crossing the gate line;

a thin film transistor connected to the gate line and the data line and including a gate electrode, an active layer, and source and drain electrodes, the drain electrode on the switching portion, and the drain electrode being an electrode directly connected to a drain region of the thin film transistor and not overlapping the pixel region, wherein the thin film transistor is disposed within the switching portion;

a first organic material layer in the pixel region, the first organic material layer having a plurality of uneven patterns at the reflective portion, wherein the plurality of uneven patterns are disposed within the reflective portion but are not formed over the switching portion, and the reflective portion and the transmissive portion do not overlap each other;

a second organic material layer on the first organic material layer, the second organic material layer having an open portion at the transmissive portion;

a reflective layer on the second organic material layer having a transmissive hole corresponding to the open portion, the reflective layer disposed on the pixel region and not overlapping the drain electrode;

a pixel electrode on the reflective layer, wherein the pixel electrode is in direct contact with the drain electrode;

a common electrode on an inner surface of the second substrate, the common electrode being substantially flat; and a liquid crystal layer between the pixel electrode and the common electrode, wherein the pixel electrode and the common electrode are separated by a first cell gap in the transmissive portion, and a second cell gap in the reflective portion, and the first cell gap is twice greater than the second cell gap.

9. The device according to claim 8, wherein the uneven patterns have a height equal to or less than the second cell gap.

10. A method of fabricating a transflective liquid crystal display device, comprising:

forming a gate line on a substrate having a switching portion, a reflective portion and a transmissive portion, a pixel region being defined to include the reflective and transmissive portions;

forming a data line crossing the gate line;

forming a thin film transistor connected to the gate line and the data line and including a gate electrode, an active layer, and source and drain electrodes, the drain electrode on the switching portion, and the drain electrode being an electrode directly connected to a drain region of the thin film transistor and not overlapping the pixel region, wherein the thin film transistor is disposed within the switching portion;

forming a first photosensitive organic material layer on the substrate;

forming a plurality of uneven patterns consisting of a first organic layer within the reflective portion by performing an exposure and development process on the first photosensitive organic material layer, the uneven patterns partially covering the substrate, wherein the reflective portion does not overlap the switching portion and the plurality of uneven patterns are not formed over the switching portion, and the reflective portion and the transmissive portion do not overlap each other;

forming a second photosensitive organic material layer on the substrate including the first organic material layer;

forming a second organic material layer having an open portion corresponding to the transmissive portion by performing an exposure and development process on the second photosensitive organic material layer;

forming a reflective layer on the second photosensitive organic material layer having a transmissive hole corresponding to the open portion, the reflective layer disposed on the pixel region and not overlapping the drain electrode;

forming a pixel electrode on the reflective layer, wherein the pixel electrode is in direct contact with the drain electrode; and forming a common electrode on an opposing substrate facing the substrate, wherein the common electrode is substantially flat.

11. The method according to claim 10, wherein the first and second photosensitive material layers are formed of a photo-acrylic resin.

12. The method according to claim 10, further comprising forming an inorganic material layer covering the gate line, the data line, and the thin film transistor.

13. The method according to claim 12, wherein the inorganic material layer is formed of one of silicon nitride and silicon oxide.

14. The method according to claim 10, further comprising forming a gate pad connected to the gate line, a data pad connected to the data line, and a capacitor electrode overlapping the gate line.

15. The method according to claim 14, wherein the second organic material layer comprises a drain contact hole exposing the drain electrode, a capacitor contact hole exposing the capacitor electrode, a gate pad contact hole exposing the gate pad, and a data pad contact hole exposing the data pad.

16. A method of fabricating a transflective liquid crystal display device, comprising:

forming a gate line on a first substrate having a switching portion, a reflective portion and a transmissive portion, a pixel region being defined to include the reflective and transmissive portions;

forming a data line crossing the gate line;

forming a thin film transistor connected to the gate line and the data line and including a gate electrode, an active layer, and source and drain electrodes, the drain electrode on the switching portion, and the drain electrode being an electrode directly connected to a drain region of the thin film transistor and not overlapping the pixel region, wherein the thin film transistor is disposed within the switching portion;

forming a first photosensitive organic material layer on the first substrate;

forming a first organic material layer having a plurality of uneven patterns at the reflective portion by performing an exposure and development process on the first photosensitive organic material layer, wherein the plurality of uneven patterns are disposed within the reflective portion but are not formed over the switching portion, and the reflective portion and the transmissive portion do not overlap each other;

forming a second photosensitive organic material layer on the first substrate having the first organic material layer;

forming a second organic material layer having an open portion corresponding to the transmissive portion by performing an exposure and development process on the second photosensitive organic material layer;

forming a reflective layer on the second organic material layer having a transmissive hole corresponding to the open portion, the reflective layer disposed on the pixel region and not overlapping the drain electrode;

forming a pixel electrode on the reflective layer, wherein the pixel electrode is in direct contact with the drain electrode;

forming a common electrode on a second substrate, wherein the common electrode is substantially flat;

attaching the first and second substrates to each other; and forming a liquid crystal layer between the pixel electrode and the common electrode, wherein the pixel electrode and the common electrode are separated by a first cell gap in the transmissive portion and a second cell gap in the reflective portion, and the first cell gap is twice greater than the second cell gap.

17. The method according to claim 16, wherein the plurality of uneven patterns are formed to have a height equal to or less than the second cell gap.

18. A transflective liquid crystal display device, comprising:

a substrate having a switching portion, a reflective portion and a transmissive portion, a pixel region being defined to include the reflective and transmissive portions;

a gate line on the substrate;

a data line crossing the gate line;

a thin film transistor connected to the gate line and the data line and including a gate electrode, an active layer, and source and drain electrodes, the drain electrode on the switching portion, and the drain electrode being an electrode directly connected to a drain region of the thin film transistor and not overlapping the pixel region, wherein the plurality of uneven patterns are disposed within the reflective portion;

an inorganic material layer covering substantially the entire surface of the substrate including the gate line, the data line, and the thin film transistor;

a plurality of uneven patterns covering portions of the inorganic material layer within the reflective portion excluding a peripheral portion of the pixel region, the uneven patterns consisting of a first organic material, wherein the reflective portion does not overlap the switching portion and the plurality of uneven patterns are not formed over the switching portion, and the reflective portion and the transmissive portion do not overlap each other;

a second organic material layer covering the first organic material layer and the uncovered portions of the inorganic material layer, the second organic material layer having an open portion at the transmissive portion; and a reflective layer on the second organic material layer having a transmissive hole at the open portion, the reflective layer disposed on the pixel region and not overlapping the drain electrode;

a pixel electrode on the reflective layer, wherein the pixel electrode is in direct contact with the drain electrode;

an opposing substrate facing the substrate; and a common electrode on an inner surface of the opposing substrate, the common electrode being substantially flat.

* * * * *